US010990091B2

(12) United States Patent
Ceschini et al.

(10) Patent No.: US 10,990,091 B2
(45) Date of Patent: Apr. 27, 2021

(54) METHOD AND APPARATUS FOR ANALYZING AN INVESTIGATED COMPLEX SYSTEM

(71) Applicant: SIEMENS AKTIENGESELLSCHAFT, Munich (DE)

(72) Inventors: Giuseppe Fabio Ceschini, Florence (IT); Alexey Fishkin, Munich (DE); Mikhail Roshchin, Munich (DE); Stuart Watson, Newark (GB)

(73) Assignee: SIEMENS AKTIENGESELLSCHAFT ( * ) Notice: Subject to any disclaimer, the term of this patent is extended or adjusted under 35 U.S.C. 154(b) by 324 days.

(21) Appl. No.: 16/072,781

(22) PCT Filed: Jan. 28, 2016

(86) PCT No.: PCT/EP2016/051744
§ 371 (c)(1),
(2) Date: Jul. 25, 2018

(87) PCT Pub. No.: WO2017/129243
PCT Pub. Date: Aug. 3, 2017

(65) Prior Publication Data
US 2019/0033842 A1 Jan. 31, 2019

(51) Int. Cl.
*G06F 11/34* (2006.01)
*G05B 23/02* (2006.01)
(Continued)

(52) U.S. Cl.
CPC ..... *G05B 23/0278* (2013.01); *G05B 23/0216* (2013.01); *G06F 9/542* (2013.01);
(Continued)

(58) Field of Classification Search
USPC .......................................................... 702/182
See application file for complete search history.

(56) References Cited

U.S. PATENT DOCUMENTS 10,481,989 B2 * 11/2019 Hofig .................. G06F 16/2246
2004/0034456 A1 * 2/2004 Felke ................. G05B 23/0278
701/32.9
(Continued)

FOREIGN PATENT DOCUMENTS

DE 102004019240 A1 11/2005

OTHER PUBLICATIONS

PCT International Search Report dated Nov. 2, 2016 and corresponding to PCT International Application No. PCT/EEP2016/051744 filed Jan. 28, 2016.

*Primary Examiner* — Paul D Lee
(74) *Attorney, Agent, or Firm* — Schmeiser, Olsen & Watts LLP

(57) ABSTRACT

A method and apparatus for analyzing an investigated complex system the complex system including a plurality of system components, the method includes the steps of providing a base virtual object oriented data model including abstract components corresponding to system components of the investigated complex system, wherein each abstract component of the base virtual object oriented data model includes parameters and attributes of the respective system component of the investigated complex system; mapping sensor tags of sensors deployed in the investigated complex system (2) and/or event names of events received from the investigated complex system to the parameters of the abstract components of the provided base virtual object oriented data model to generate a dedicated data model for the system type of the investigated complex system; and performing a failure mode and/or a root-cause analysis of (Continued)

the investigated complex system on the basis of the dedicated data model.

15 Claims, 8 Drawing Sheets

(51) Int. Cl.
    *G06F 16/28*     (2019.01)
    *G06F 9/54*     (2006.01)
(52) U.S. Cl.
    CPC ........ *G06F 11/3447* (2013.01); *G06F 16/289* (2019.01); *G06F 2201/86* (2013.01)

(56) References Cited

U.S. PATENT DOCUMENTS

| | | | | |
|---|---|---|---|---|
| 2004/0039499 | A1* | 2/2004 | Felke | G06F 16/284 701/29.3 |
| 2004/0193938 | A1* | 9/2004 | Shah | H04L 1/22 714/2 |
| 2004/0193958 | A1* | 9/2004 | Shah | G06F 11/0748 714/37 |
| 2004/0205397 | A1* | 10/2004 | Rajiv | G05B 17/02 714/25 |
| 2004/0205398 | A1* | 10/2004 | Osborn | G05B 23/0278 714/25 |
| 2005/0049988 | A1 | 3/2005 | Dahlquist et al. | |
| 2012/0290104 | A1* | 11/2012 | Holt | G06Q 10/00 700/29 |
| 2013/0123944 | A1 | 5/2013 | Reichard et al. | |
| 2015/0019187 | A1* | 1/2015 | Jones | G06F 30/20 703/8 |
| 2015/0142402 | A1* | 5/2015 | Ramesh | G06F 30/20 703/7 |
| 2015/0278301 | A1* | 10/2015 | vanderZweep | G06F 16/2457 707/716 |
| 2018/0164760 | A1* | 6/2018 | Felke | G06F 16/116 |

* cited by examiner

FIG 2

```
CS      UN    NA0014/01
        ST    TC1, TC10, TC11, TC12, TC13, TC2, TC3, TC4, TC5, TC6, TC7, TC8, TC9
R
signal(*FAIL: Thermocouple TC1*) =
comparison(>, sd(#*TC1*, 20m), 5*max(sd(#*TC2*, 20m), sd(#*TC3*, 20m), sd(#*TC4*, 20m), sd(#*TC5*, 20m),
          sd(#*TC6*, 20m), sd(#*TC7*, 20m), sd(#T ...

signal(*FAIL: Thermocouple TC1*) =
comparison(==, sd(#*TC1*, 20m), 0): duration(>=30m);
```

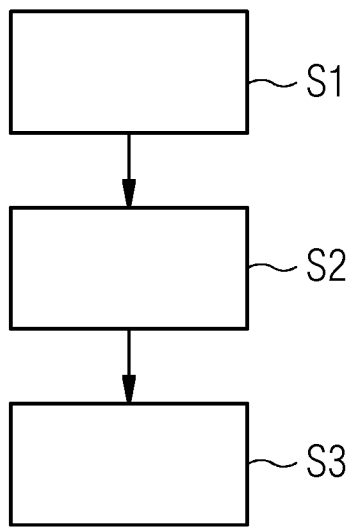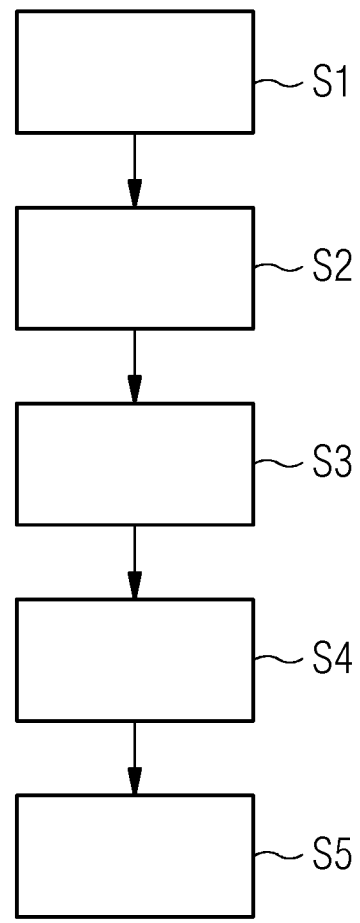

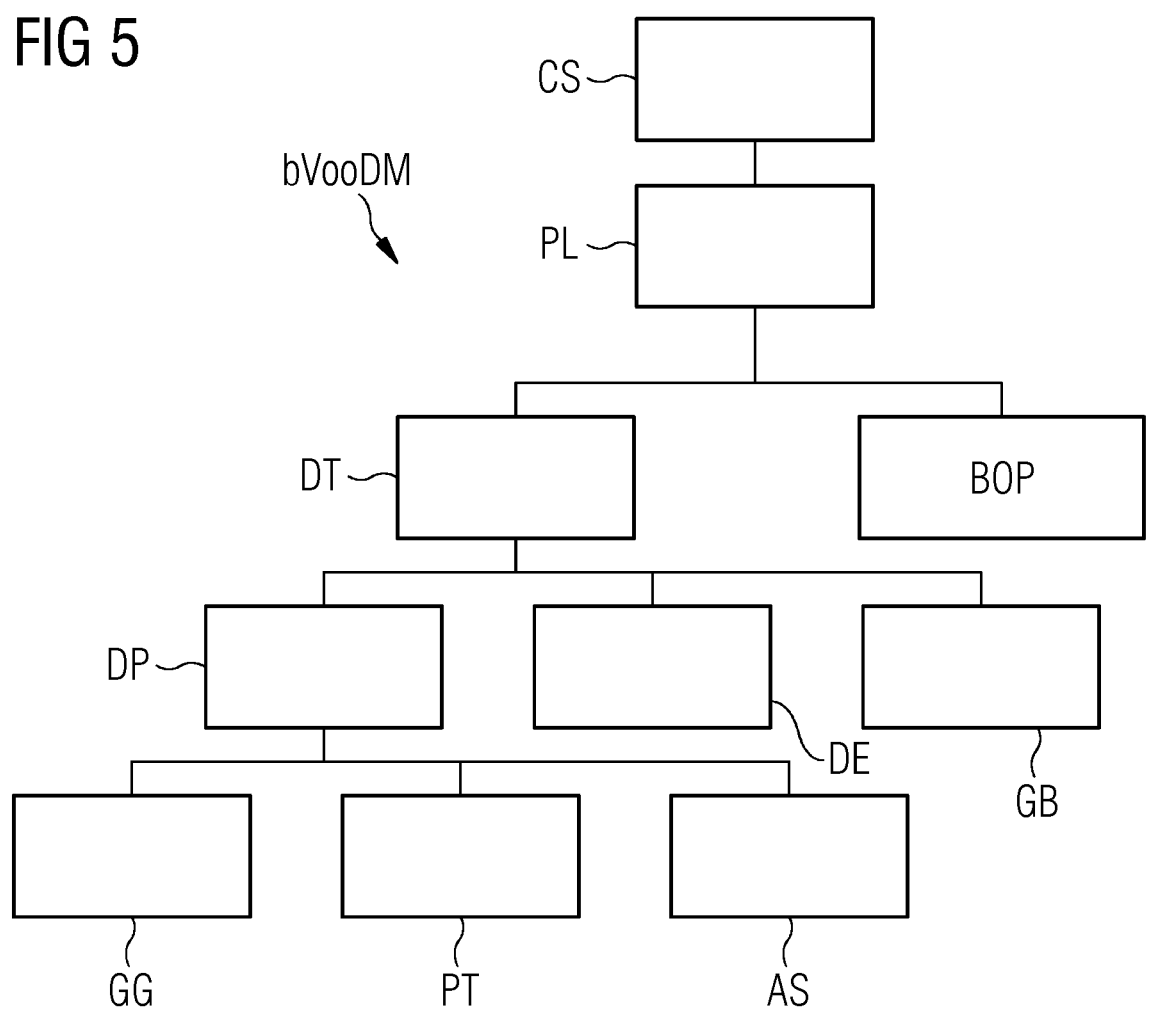

METHOD AND APPARATUS FOR ANALYZING AN INVESTIGATED COMPLEX SYSTEM

CROSS-REFERENCE TO RELATED APPLICATIONS

This application claims priority to PCT Application No. PCT/EP2016/051744, having a filing date of Jan. 28, 2016, the entire contents of which are hereby incorporated by reference.

FIELD OF TECHNOLOGY

The following relates to a method and apparatus for analyzing an investigated complex system such as a turbine system.

BACKGROUND

A complex technical system can comprise a plurality of subsystems and system components. These system components can comprise hardware and/or software components. An example of a complex system is a turbine system for generating electrical energy. The basic operation of the gas turbine is similar to that of a steam turbine except that air is used instead of water. The air flows through a compressor that brings it to higher pressure. Energy is then added by spraying a fuel into the air and igniting it so that the resulting combustion generates a high-temperature flow. The generated high-temperature high-pressure gas enters the turbine where it expands down to the exhaust pressure producing a shaft work output. The turbine shaft work can be used to drive the compressor and other subsystems such as an electric generator that may be coupled to the shaft. Turbines can be used for any kind of vehicles and/or electrical generators.

Such a complex system comprising a plurality of subsystems or system components is monitored during operation to avoid failures. In a conventional complex system such as a gas or steam turbine, a large number of sensors can be deployed to register relevant physical parameters of the same or different subsystems and/or system components such as rotor speed, burner tip temperature or oil temperature. The measured parameter values can be used by a local control system of the respective complex system.

Using the sensor data provided by the deployed sensors, i.e. the measured physical parameter values, and the detected events, from the control system, a service engineer can monitor a performance of the respective complex system, for instance the turbine performance of a gas or steam turbine. If there is a deviation from the normal operation or a failure such as an abnormal turbine shutdown, it is the task of the service engineer to figure out the failure mode having caused the abnormal operation. Examples for such a failure mode of a turbine complex system are for instance thermocouple failures, gear box vibration failures or a blow-off valve failure. The service engineer then can eliminate the root-cause of the identified failure and start the complex system or turbine which had shutdown again.

Often, a service provider performs the monitoring of a plurality of complex systems via a remote diagnostic center connected to the local control systems of the different monitored complex systems. For instance, a remote monitoring service provider can monitor a large number of different turbines from different manufacturers receiving data from different control systems of the monitored complex systems or turbines. The received turbine sensor data can be stored in a data base of a central remote server of the service provider. For each complex system or turbine, the sensor data can be stored in a single table having a sensor tag name column. By using a client server software application and known sensor tag names, a monitoring engineer at the remote diagnostic center of the service provider can browse the received sensor data along with events received from the control systems of the different turbines.

For instance, FIG. 1 shows a view displayed to the monitoring engineer showing a thermocouple failure. In the illustrated FIG. 1, the sensor data received from a thermocouple sensor TC jumps from a first to a second level during the monitored time indicating a possible failure. Further, the remote server of a diagnostic center may receive events from the different complex systems such as:

14.02.2014 11:46:42 Warning TURBINE TEMPERATURE DEVICE FAILED
14.02.2014 12:38:36 Warning TURBINE TEMPERATURE DEVICE FAILED The warnings represent events having taken place at a complex system monitored by the remote server of the service provider. These indicated events normally comprise a timestamp indicating when the remote server of the service provider has received an event message. With such a conventional system, a monitoring engineer is made aware of failure events at a monitored turbine or complex system but cannot immediately find out which components of the respective complex system are involved or responsible for the failure or suspicious operation behavior of the monitored complex system.

To find out the cause of the failure or the responsible component, the monitoring engineer at the remote diagnostic center does normally generate different trend views or event views, i.e. a graph for several physical parameters along with a filter for the control system events. Further, the monitoring engineer may formulate and monitor a failure mode rule, for instance a logical-numerical formula for several physical parameter values and thresholds TH along with a pattern for matching the events. FIG. 2 shows an example for failure mode detection rules R formulated by a monitoring engineer. In the given example, a complex system CS such as a turbine having a unit name UN: "NA0014/01" comprises a plurality of sensors having sensor tags STs TC1 to TC13. If one of the defined failure mode rules R is fulfilled, the failure of a specific component such as thermocouple TC1 can be signaled to the monitoring engineer.

A severe drawback of such a conventional monitoring approach is that the monitoring engineer has to specify the sensor tags and/or event names of different events as well as the attributes, in particular the physical parameter thresholds. However, there is no unified convention for sensor tags ST or event names EN or attributes across a plurality of different complex systems CS produced for instance by different manufacturers. The designations of components within a complex system CS can be quite complex itself having a plurality of letters and numbers which may vary for each single complex system monitored by the service provider. Accordingly, a monitoring engineer programming a fault detection rule must be aware of the different designation systems DS or names used for a plurality of components of different complex systems. Furthermore, the physical parameters which can be used in defining a failure mode detection rule are not configured to any standard system of units, such as SI units, and threshold values may not be available from a data storage. Consequently, for each complex system CS, the monitoring engineer must manually adopt trend views or event views and define manually failure mode detection rules using tags and names which may differ for each system type of a complex system. Therefore, the definition of a failure mode detection rule R is very cumbersome and can be prone to errors or failures itself. Further, the manual definition of failure mode detection rules R and the generation of trend or event views in case of detected failure events can take a long time before the system monitoring engineer can find out the likely cause of a component responsible for the failure event of the monitored complex system CS. If for instance a turbine temperature failure of a specific turbine or complex system has been notified to the monitoring system engineer at the remote service provider, the affected complex system CS may be immediately shutdown to avoid further damages and the monitoring engineer will try to find out the responsible component or cause as fast as possible. The creation and monitoring of trend views and/or event views as well as the formulation of possible failure mode detection rules may take a considerable time during which the affected complex system such as a turbine cannot operate.

SUMMARY

An aspect relates to providing a method and an apparatus for analyzing an investigated complex system of a specific system type allowing to reduce the time required to find out an origin of an observed failure of the investigated complex system.

Embodiments of the invention provide according to a first aspect of the present invention a method for analyzing an investigated complex system of a specific system type, said complex system comprising a plurality of system components, the method comprising the steps of:

providing a base virtual object oriented data model comprising abstract components corresponding to system components of the investigated complex system, wherein each abstract component of the base virtual object oriented data model comprises parameters and attributes of the respective system component of the investigated complex system, mapping sensor tags of sensors deployed in the investigated complex system and/or event names of components of the provided base virtual object oriented data model to generate a dedicated data model for the system type of the investigated complex system, and performing a failure mode and/or a root-cause analysis of the investigated complex system on the basis of the dedicated data model generated for the specific system type of the investigated complex system.

In a possible embodiment of the method according to the first aspect of the present embodiments of the invention, the base virtual object oriented data model is a tree structured hierarchical object oriented data model comprising abstract components corresponding to system components of the investigated complex system and being connected to each other via triple relations.

In a further possible embodiment of the method according to the first aspect of the present embodiments of the invention, the base virtual object oriented data model is loaded from a data base of a remote monitoring service provider providing a remote monitoring service to monitor an operation of a number of complex systems of the same or different system types operated by clients of the remote monitoring service provider.

In a possible embodiment of the method according to the first aspect of the present embodiments of the invention, the sensor tags of sensors deployed in an investigated complex system and/or the event names of events are supplied by a data collector of the investigated complex system via a communication network to a remote server of a remote monitoring service provider.

In a still further possible embodiment of the method according to the first aspect of the present embodiments of the invention, the remote server of the remote monitoring service provider performs automatically the mapping of received sensor tags and/or received event names to the parameters of the abstract components of the base virtual object oriented data model loaded from the data base of said remote monitoring service provider to generate the dedicated data model for the system type of the investigated complex system.

In a further possible embodiment of the method according to the first aspect of the present embodiments of the invention, the attributes of the abstract components of the base virtual object oriented data model are set by means of a user interface of the remote server of said remote monitoring service provider.

In a further possible embodiment of the method according to the first aspect of the present embodiments of the invention, the attributes of the abstract components of the base virtual object oriented data model are set automatically to default values preconfigured for the respective system type of the investigated complex system and stored in a data base of said remote monitoring service provider.

In a possible embodiment of the method according to the first aspect of the present embodiments of the invention, the attributes of the abstract components of the provided base virtual object oriented data model comprise threshold values.

In a still further possible embodiment of the method according to the first aspect of the present embodiments of the invention, the investigated complex systems monitored by the remote monitoring service provider are distributed complex systems located at different client sites of clients of the remote monitoring service provider.

In a still further possible embodiment of the method according to the first aspect of the present embodiments of the invention, control signals and/or warning signals for the investigated complex system are generated automatically by the remote server of the remote monitoring service provider depending on the results of the failure mode and/or root-cause analysis performed by the remote server on the basis of the dedicated data model generated by the remote server for the specific system type of the investigated complex system.

In a further possible embodiment of the method according to the first aspect of the present embodiments of the invention, the control signals generated by the remote server for the investigated complex system are applied to hardware and/or software system components of the investigated complex system to provide a remote repair service and/or remote maintenance service by said remote monitoring service provider to clients operating the investigated complex system.

In a still further possible embodiment of the method according to the first aspect of the present embodiments of the invention, the generation of the dedicated data model for a specific system type of a complex system by said remote server of the remote monitoring service provider is triggered by an event received by the remote server from the complex system and performed on the fly during operation of the complex system.

In a further possible embodiment of the method according to the first aspect of the present embodiments of the invention, the generation of the dedicated data model for a specific system type of a complex system by said remote server of the remote monitoring service provider is performed when the complex system is installed at a client site of a client of the remote monitoring service provider operating the respective complex system.

In a still further possible embodiment of the method according to the first aspect of the present embodiments of the invention, the investigated complex system comprises a gas turbine system or a steam turbine system having a plurality of turbine system components.

Embodiments of the the invention provide according to the second aspect a monitoring apparatus adapted to analyze an investigated complex system comprising a plurality of system components, said monitoring apparatus comprising: a data base which stores a base virtual object oriented data model comprising abstract components corresponding to system components of the investigated complex system, wherein each abstract component of the base virtual object oriented data model comprises parameters and attributes of the respective system component of the investigated complex system, a processing unit adapted to map sensor tags of sensors deployed in the investigated complex system and/or event names of events received from the investigated complex system to parameters of the abstract components of the provided virtual object oriented data model and being further adapted to set the attributes of the abstract components of the provided base virtual object oriented data model to generate a dedicated data model for the system type of the investigated complex system, and an analyzing unit adapted to perform a failure mode and/or root-cause analysis of the investigated complex system on the basis of the dedicated data model generated by said processing unit for the specific system type of the investigated complex system.

In a possible embodiment of the monitoring apparatus according to the second aspect of the present embodiments of the invention, the monitoring apparatus is a remote monitoring apparatus of a remote monitoring service provider connected via a communication network to a number of complex systems, wherein said remote monitoring apparatus comprises a remote server comprising said processing unit and said analyzing unit and being adapted to load the virtual object oriented data model from a data base of said remote monitoring apparatus.

Embodiments of the invention further provide according to a third aspect a complex system, in particular a complex turbine system, comprising a plurality of hardware and/or software system components said complex system being adapted to supply sensor tags of sensors deployed in the complex system and/or event names of events detected in said complex system via an interface to a monitoring apparatus performing the method according to the first aspect of the present invention.

BRIEF DESCRIPTION

Some of the embodiments will be described in detail, with reference to the following figures, wherein like designations denote like members, wherein:

FIG. 2 shows an example of a definition of failure mode detection rules for a complex system for illustrating a problem underlying the present embodiments of the invention;

FIG. 3 shows a flowchart of a possible embodiment of a method for analyzing an investigated complex system according to the first aspect of the present embodiments of the invention;

FIG. 4 shows a further flowchart for illustrating a possible embodiment of a method according to the first aspect of the present embodiments of the invention;

FIG. 5 shows a diagram for illustrating a simple base virtual object oriented data model which can be used by the method and apparatus according to the different aspects of the present embodiments of the invention;

DETAILED DESCRIPTION

Figure 1:
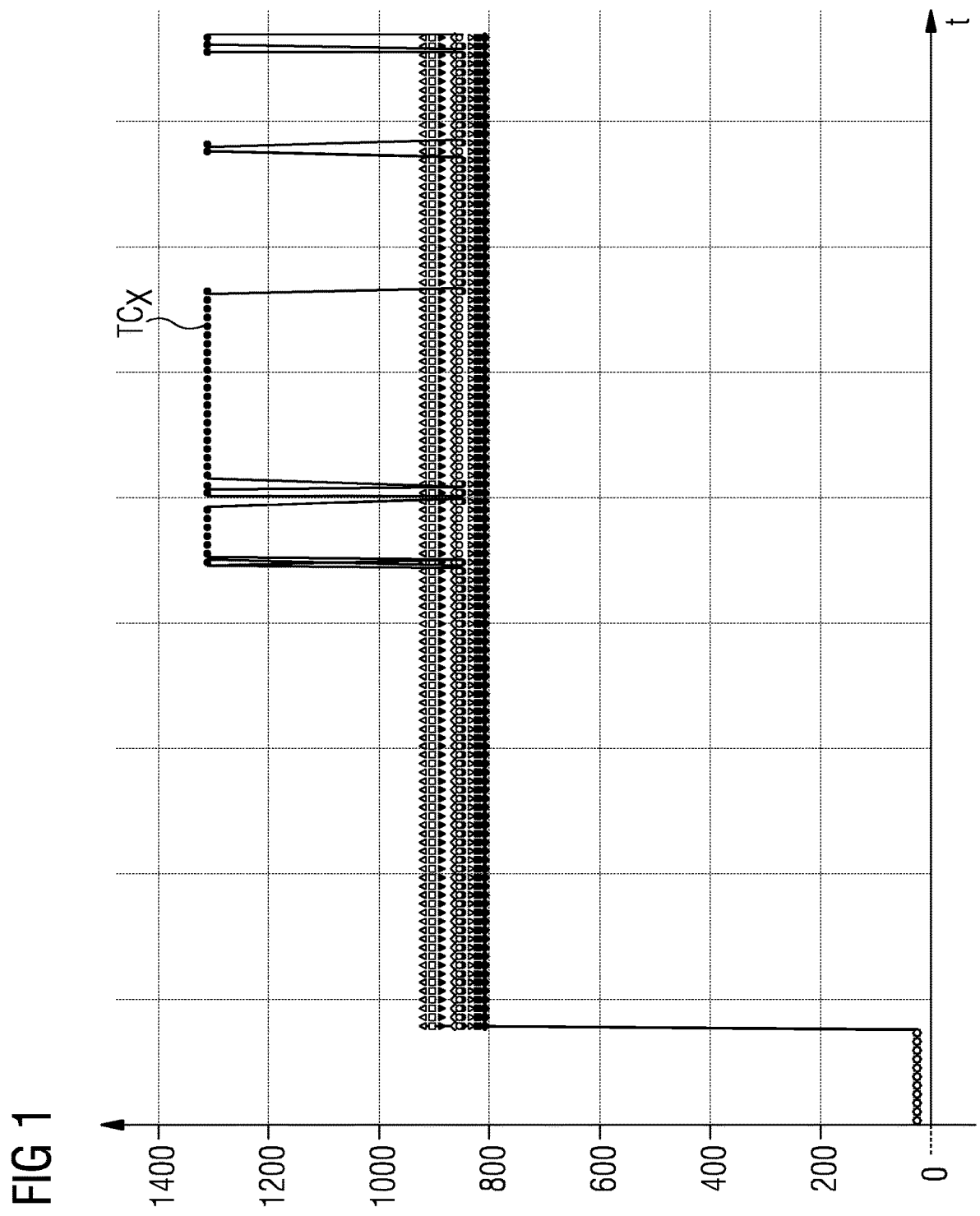
FIG. 1 shows an view displayed on a display unit of a remote diagnostic center to a monitoring engineer of a conventional monitoring method.

As can be seen in FIG. 3, a method for analyzing an investigated complex system of a specific system type according to the first aspect of the present embodiments of the invention can comprise several steps. The investigated complex system can comprise a plurality of system components and/or subsystems. An example of a complex system is for instance a gas turbine system comprising a plurality of hardware and/or software components.

In a first step S1, a base virtual object oriented data model is provided. The base virtual object oriented data model comprises abstract components corresponding to the system components or subsystems of the investigated complex system. Each abstract component of the base virtual object oriented data model comprises parameters and attributes of the respective system component of the investigated complex system. FIG. 5 shows an example of a base virtual object oriented data model for a gas turbine system. The base virtual object oriented data model can be stored in a data memory, for instance in the data base of a monitoring server.

In a further step S2, sensor tags of sensors deployed in the investigated complex system and/or event names of events received from the investigated complex system are mapped to the parameters of the abstract components of the provided base virtual object oriented data model to generate a dedicated data model for the system type of the investigated complex system. As illustrated in FIG. 5, the base virtual object oriented data model is in a embodiment a tree structured hierarchical object oriented data model comprising abstract components corresponding to system components of the investigated complex system and being connected to each other via triple relations. An example for a triple relation is, for instance, component A contains component B. The base virtual object oriented data model can be loaded in a possible embodiment from a data base.

In a further step S3 of the method as illustrated in FIG. 3, a failure mode and/or a root-cause analysis of the investigated complex system can be performed on the basis of the dedicated data model generated for the specific system type of the investigated complex system. The base virtual object oriented data model can comprise abstract components or subsystems as shown in the example illustrated in FIG. 5 which may include attributes, physical parameters and threshold values such as type, speed, load and temperature. A configuration of the base virtual object oriented data model can be accomplished by mapping the sensor tags and/or event names and by setting the attributes and/or threshold values. If, for instance, two out of three sensor readings are used also several sensor tags can be mapped to physical parameters of the abstract components within the base virtual object oriented data model. As shown in FIG. 5, a base virtual object oriented data model bVooDM can comprise as abstract components a client site CS including a plant PL. The base virtual object oriented data model can comprise further abstract base components, for instance a drive train DT as illustrated in the example of FIG. 5. Each drive train DT comprises a gear box GB, a driven equipment DE or a driver package DP. The driver package DP can comprise a gas generator GG, a power turbine PT at auxiliary systems AS. A turbine can have a rotor with a speed sensor and a burning chamber with several burner tip thermocouples TC. The driven equipment DE form also an abstract component of the base virtual object oriented data model and can be specialized either as an alternator with a power sensor or a compressor/pump with a pressure sensor. Accordingly, for each application type and/or system type of the investigated complex system, a dedicated data model is generated automatically wherein the generated dedicated data model does inherit the properties of the base virtual object oriented data model which can be loaded from a data base. Finally, for each client site CS of a client comprising a plant PL, a configuration of the dedicated data model and components can be provided. In this way, it is assured that the common components such as a turbine burning chamber with burner tip thermocouples are modelled and configured in the same way across the whole turbine fleet which may be monitored by a remote service provider. For each dedicated data model using a virtual turbine domain specific language, i.e. using the tree structure, component names, attribute names, parameter names and threshold names, it is possible to create trend views and/or event views and to formulate failure mode rules in a simple uniform way. Accordingly, for a single failure mode, it is possible to share the respective trend views and/or event views as well as rules among all turbines of the same or similar system type. In a possible embodiment, the system type of the investigated complex system is determined automatically.

In a failure mode analysis such as failure mode and effect analysis FMEA, the investigated complex system such as a turbine system can be analyzed on the basis of the generated dedicated data model generated for the specific system type of the investigated complex system. Further, a root-cause analysis can be applied to identify root-causes of faults. A factor is considered a root-cause where removal thereof from a problem fault sequence does prevent a final undesirable event from recurring.

By application of the base virtual object oriented data model along with use of a virtual turbine domain specific language, it is possible with the method according to the present embodiments of the invention to map automatically sensor tags of sensors and/or event names of events received from investigated different complex systems to generate the dedicated data model for the respective system type of the investigated complex system and then to perform a failure mode and a root-cause analysis.

This provides the following advantages.

Generic failure modes such as start-up failures or blow-off valve failures can be formulated for a whole fleet of investigated complex systems such as a turbine fleet only once.

Further, domain knowledge, i.e. failure rules and/or trend/event views can be formulated only once for the turbines of complex systems of the same or similar system type.

Further, a root-cause analysis can be performed in a unified manner. In the root-cause analysis, one goes down in the component tree of the tree structured virtual object oriented data model while checking the component's states (either failure or normal).

The method for analyzing an investigated complex system according to the first aspect of the present embodiments of the invention provides a significant reduction in the engineering time while simplifying and unifying the whole failure mode and root-cause analysis. In the long term, when enough information or data on the root-cause analysis becomes available, the method further can lead to improvements in the discovery of weak system components which are prone to errors. Such a weak component might be for instance the lubrication subsystem of a complex system. Further, it is possible to perform an efficient failure risk analysis. For instance, it might be detected that igniters are likely to fail within the next two to three weeks. Further, the method according to the present embodiments of the invention improves predictive maintenance planning (for instance, the affected igniters should be replaced as soon as possible). Moreover, the method according to the present embodiments of the invention improves the availability of full complex systems or subsystems. For instance, the method can cause a reduction in forced outages of the monitored turbine system.

In a possible embodiment of the method according to the first aspect of the present embodiments of the invention, the provided base virtual object oriented data model such as illustrated in FIG. 5 can be loaded from a data base of a remote monitoring service provider providing a remote monitoring service to monitor an operation of a number of complex systems of the same or different system types operated by clients of the remote monitoring service provider. For instance, a remote monitoring service provider can monitor a fleet of turbines distributed on different client locations or client sites of clients of the service provider. In a possible embodiment, the sensor tags employed in the investigated complex system and/or the event names of the events can be supplied by a data collector of the investigated complex system via a communication network to a remote server of the remote monitoring service provider. The remote monitoring service provider can perform automatically the mapping of the received sensor tags and/or received event names in step S2 to the parameters of the abstract components of the base virtual object oriented data model loaded from the data base of the remote monitoring service provider to generate the dedicated data model for the system type of the investigated complex system. In a possible embodiment, the attributes of the abstract components of the base virtual object oriented data model are set in step S2. The setting of the attributes of the abstract components of the base virtual object oriented data model can be performed in a possible embodiment by a user via a user interface of the remote server of the remote monitoring service provider. Further, it is possible that attributes of the abstract components of the base virtual object oriented data model are set automatically in step S2 to default values preconfigured for the respective system type of the investigated complex system and stored in a data base of the remote monitoring service provider. The attributes of the abstract components of the provided base virtual object oriented data model can comprise in a possible embodiment threshold values.

In a further possible embodiment of the method according to the present embodiments of the invention as illustrated in the flowchart of FIG. 4, control signals and/or warning signals for the investigated complex system can be generated in step S4 automatically by the remote server of the remote monitoring service provider depending on the results of the failure mode and/or root-cause analysis performed by the remote server in step S3 on the basis of the dedicated data model generated by the remote server for the specific system type of the investigated complex system. The generated control signals generated by the remote server of the investigated complex system can be applied in a further step S5 to hardware and/or software components of the investigated complex system to provide a remote repair service and/or remote maintenance service by the remote monitoring service provider to clients operating the investigated complex system, for instance to clients or operators operating an investigated turbine system.

In a possible embodiment of the method according to the present embodiments of the invention, the generation of the dedicated data model for a specific system type of a complex system by the remote server of the remote monitoring service provider in step S2 can be triggered by an event received by the remote server from the complex system, for instance via a communication network. In this case, the generation of the dedicated data model for the specific system type of the complex system is performed on the fly during operation of the complex system. In an alternative embodiment of the method according to the present embodiments of the invention, the generation of the dedicated data model for a specific system type of a complex system in step S2 can be performed when the respective complex system such as the turbine system is planned and/or installed at a client site of a client of the remote monitoring service provider operating the complex system.

Figure 6:
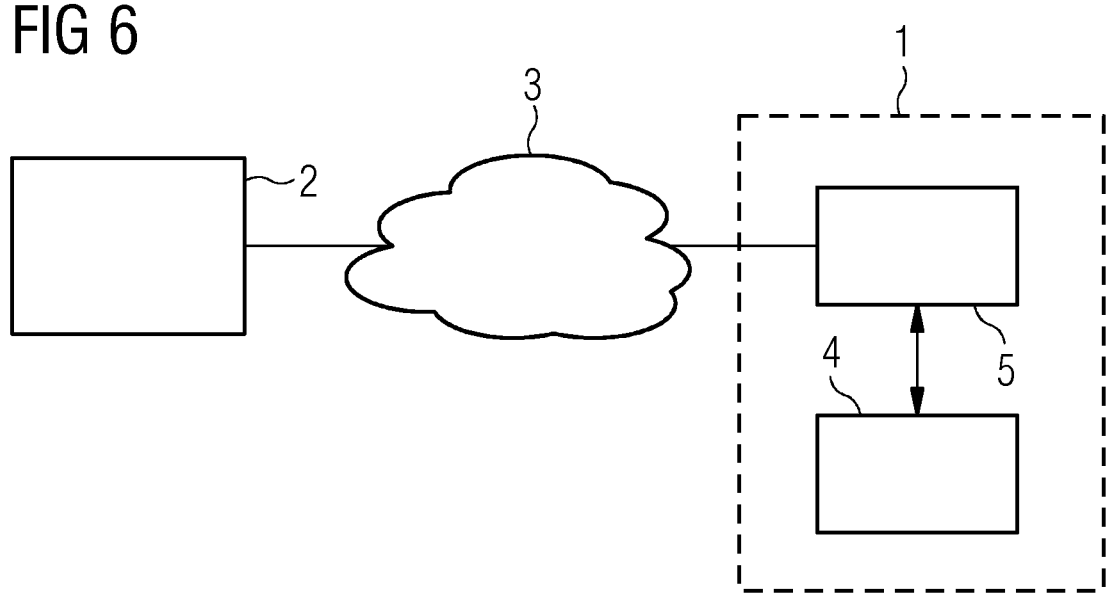
FIG. 6 shows a block diagram for illustrating a possible embodiment of a remote monitoring apparatus according to the second aspect of the present embodiments of the invention.

FIG. 6 shows a block diagram of a possible embodiment of a monitoring apparatus 1 according to the second aspect of the present embodiments of the invention, wherein the monitoring apparatus 1 is adapted to analyze an investigated complex system 2 comprising a plurality of system components and/or subsystems. The complex system 2 can be for instance a turbine system connected via a communication network 3 to the remote monitoring apparatus 1 as illustrated in FIG. 6. The communication network 2 can be a wired or wireless communication network. The remote monitoring apparatus 1 comprises in the illustrated embodiment a data base 4 which stores a base virtual object oriented data model comprising abstract components corresponding to system components of the investigated complex system. If the investigated complex system 2 is for instance a turbine system, the data base 4 of the monitoring apparatus 1 can comprise a base virtual object oriented data model comprising abstract components corresponding to system components of a turbine system. Each abstract component of the base virtual object oriented data model stored in the data base 4 of the remote monitoring apparatus 1 comprises parameters and attributes of the respective system component of the investigated complex system 2. As can be seen in FIG. 6, the remote monitoring apparatus 1 comprises a remote monitoring server 5 having access to the data base 4.

Figure 7:
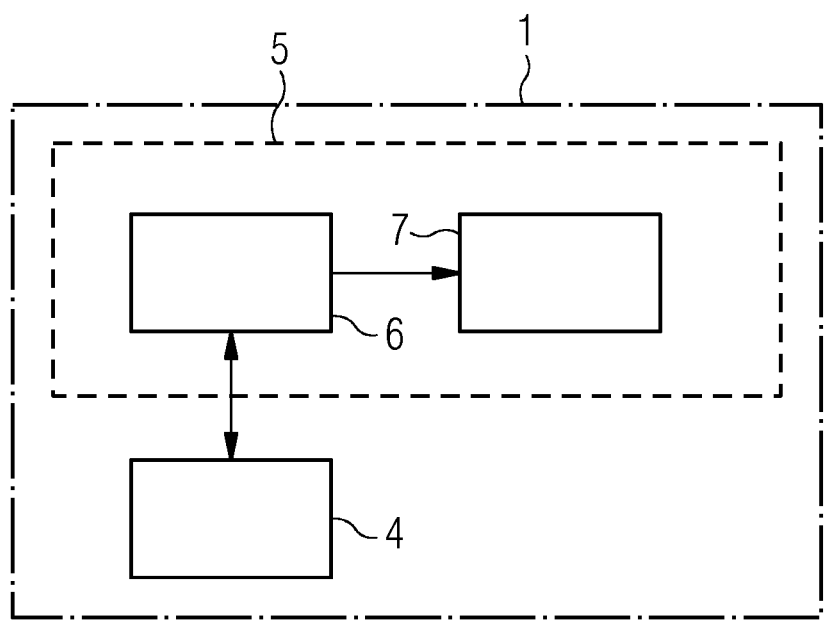
FIG. 7 shows a block diagram of a possible embodiment of a remote server within the remote monitoring apparatus shown in FIG. 6.

As illustrated in FIG. 7, the remote server 5 of the remote monitoring apparatus 1 comprises in a possible embodiment a processing unit 6 and an analyzing unit 7. The processing unit 6 is adapted to map sensor tags of sensors deployed in the investigated complex system 2 and/or event names of events received from the investigated complex system 2 to parameters of the abstract components of the provided base virtual object oriented data model. The processing unit 6 is further adapted to set attributes of the abstract components of the provided base virtual object oriented data model to generate a dedicated data model for the system type of the investigated complex system. The generated dedicated data model for the system type of the investigated complex system 2 is supplied by the processing unit 6 of the server S to the analyzing unit 7 of the server 5 as shown in FIG. 7. The analyzing unit 7 of the server 5 is adapted to perform a failure mode and/or a root-cause analysis of the investigated complex system 2 on the basis of the received dedicated data model generated by the processing unit 6 for the specific system type of the investigated complex system 2. The monitoring apparatus 1 shown in FIG. 6 is in a possible embodiment a remote monitoring apparatus of a remote monitoring service provider connected via the communication network 2 to a number N of complex systems, for instance to several turbine systems of a turbine fleet.

Figure 8:
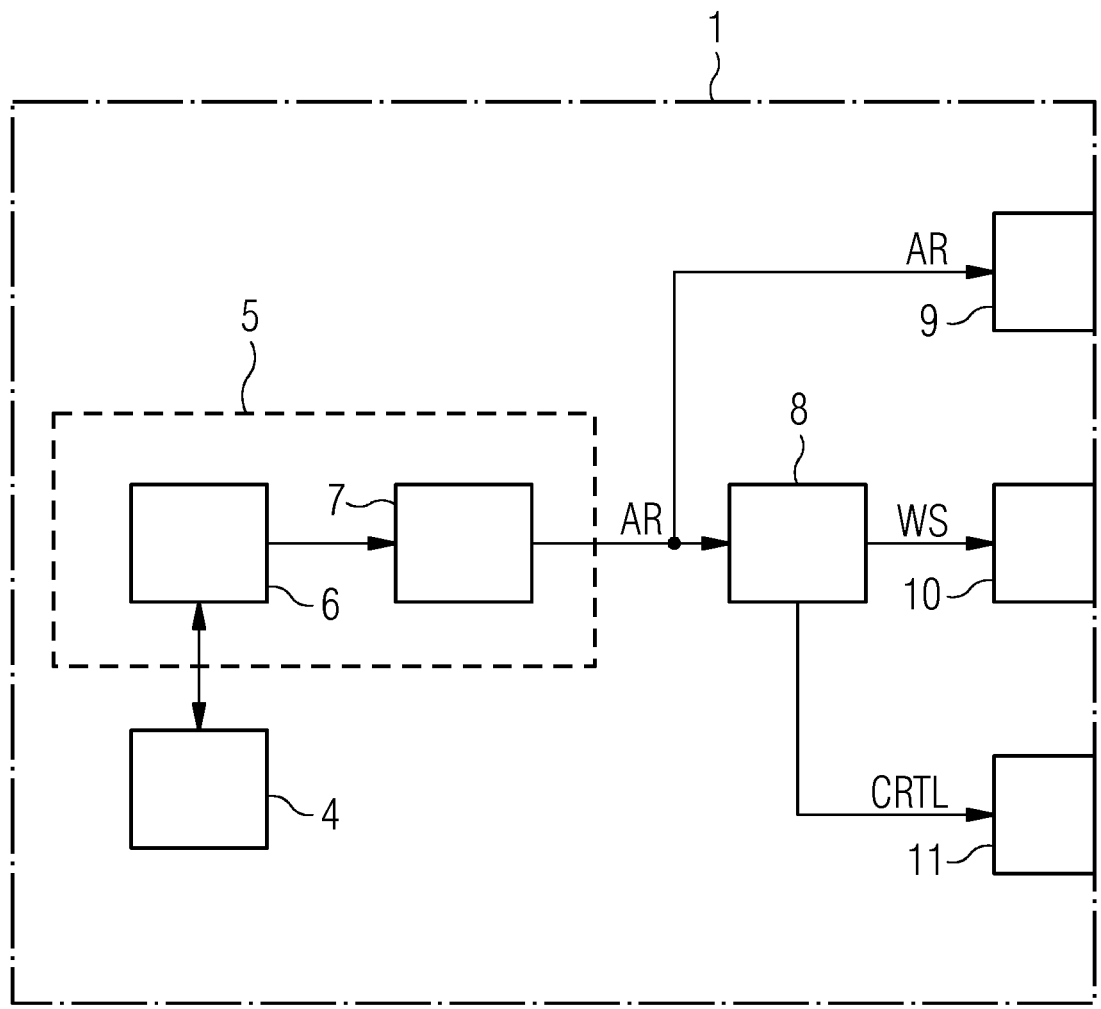
FIG. 8 shows a further block diagram for illustrating a possible embodiment of a remote monitoring apparatus according to the second aspect of the present embodiments of the invention.

FIG. 8 shows a block diagram of a possible implementation of a remote monitoring apparatus 1 according to the second aspect of the present embodiments of the invention. In the illustrated embodiment, the remote monitoring apparatus 1 further comprises a control unit 8 adapted to generate control signals CRTL and/or warning signals WS for the investigated complex system 2. The control signals CRTL and warning signals WS are generated by the control unit 8 of the remote server 5 depending on the results of the failure mode and/or root-cause analysis output by the analyzing unit 7. In a possible embodiment, the analyzing results AR of the analyzing unit 7 can further be output via a data interface 9 to a data processing unit for further processing. The warning signals WS generated by the control unit 8 can be output via a user interface 10 to a monitoring engineer of the remote service provider. The control signals CRTL generated by the control unit 8 of the server 5 can be output by a control interface 11 and applied via a control signal lines to components of the investigated complex system. The control signals CRTL generated by the control unit 8 of the remote server 5 can be applied to hardware and/or software system components of the investigated complex system 2 to provide a remote repair service and/or a remote maintenance service by the remote monitoring service provider to clients operating the respective investigated complex system 2.

Figure 9:
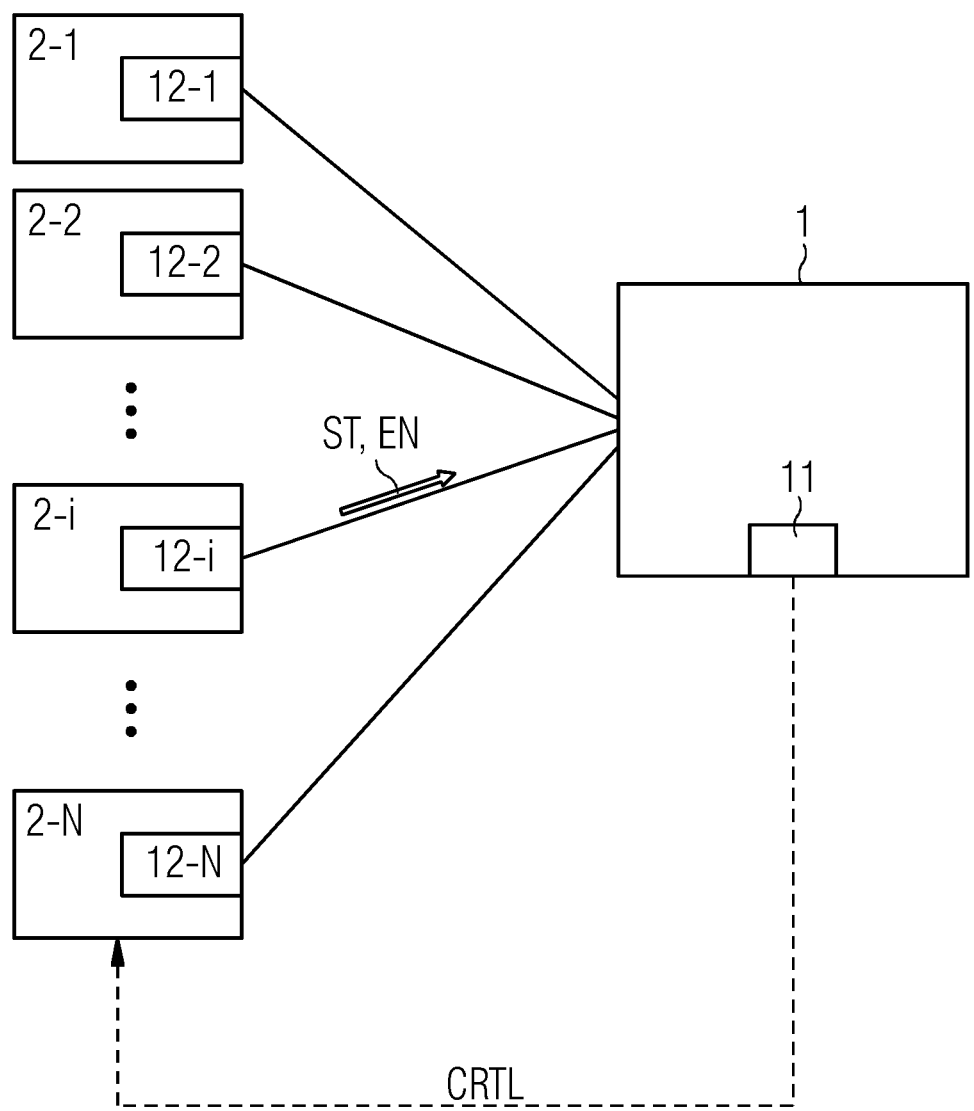
FIG. 9 shows a further block diagram for illustrating a possible embodiment of a monitoring system employing a remote monitoring apparatus according to the second aspect of the present embodiments of the invention.

This is illustrated in FIG. 9. The generated control signals output by the control signal interface 11 can be applied via a control signal channel to the different complex systems 2-1, 2-2, . . . 2-w monitored by the remote monitoring apparatus 1 being connected to the monitored complex systems 2-$i$ such as turbine systems via communication links of the same or different communication networks. As illustrated in FIG. 9, each complex system 2-$i$ can comprise a local control system having a data collector 12-$i$. The data collector 12-$i$ supplies sensor tags ST of sensors deployed in the respective investigated complex system and/or event names EN of events detected in the respective complex system via a communication link or a communication network to the remote server 5 of the remote monitoring apparatus 1.

Figure 10:
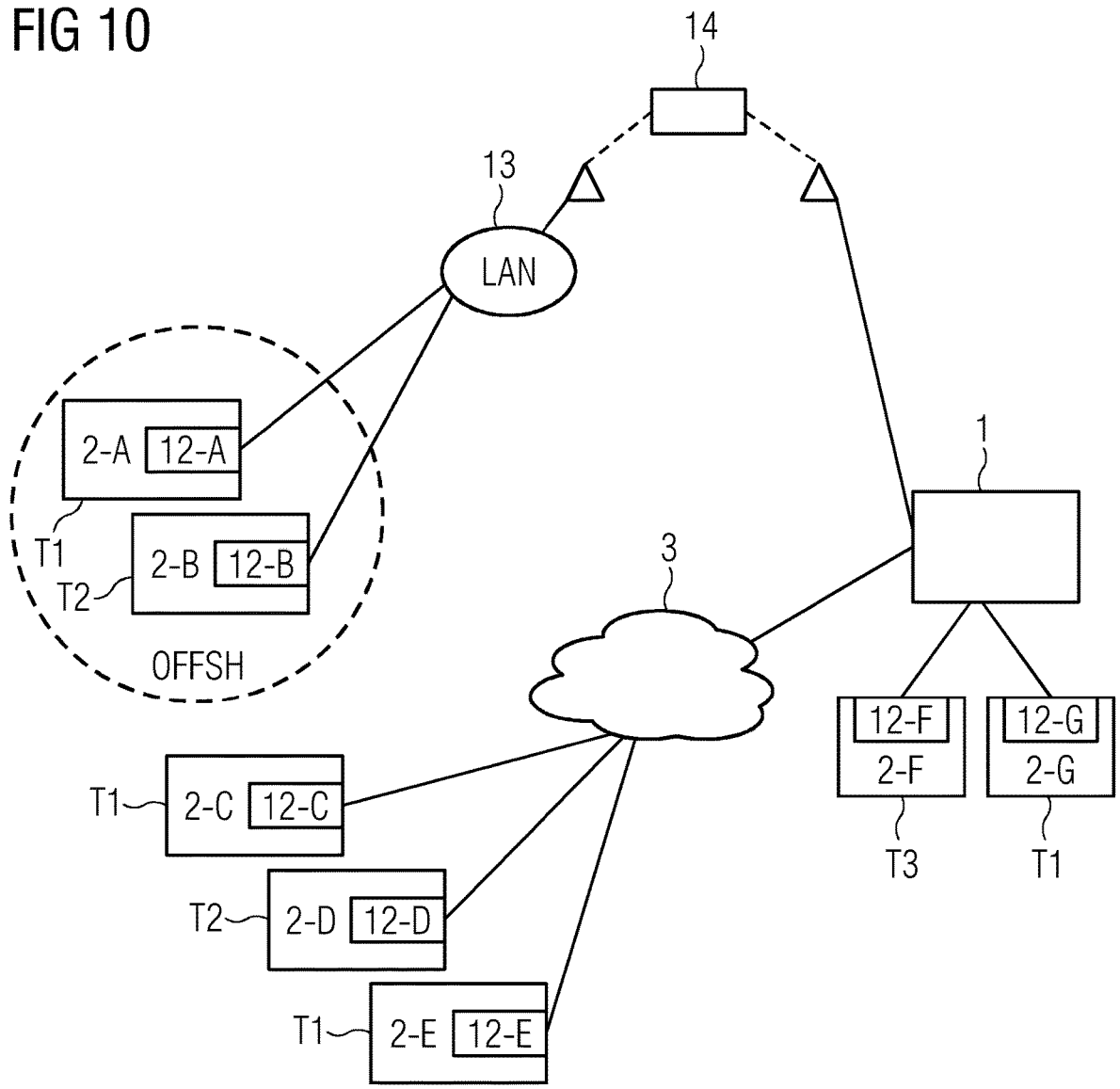
FIG. 10 shows a further schematic diagram of a system using a remote monitoring apparatus according to the second aspect of the present embodiments of the invention.

The remote monitoring service provider can monitor and/or control a plurality of different complex systems such as turbine systems being distributed worldwide in different countries. FIG. 10 shows schematically an monitoring and/or control system of a remote monitoring service provider. A complex system 2-A of a first system type T1 is located in the illustrated example offshore OFFSH along with another complex system B of a second system type T2. Both systems comprise a data collector 12 for applying the sensor tags of sensors deployed in the investigated complex systems 2-A, 2-B via a local area network 13 and a satellite communication link 14 to a data input interface of the remote monitoring apparatus 1. Other complex systems 2-C, 2-D, 2-E each comprising also a data collector 12-C, 12-D, 12-E are connected via a separate communication network 3 to another data input interface of the remote monitoring apparatus 1. In the given example, the complex systems 2-C, 2-E are of the same system type 1 T1 similar to the offshore complex system 2-A. The complex system 2-D is of a second system type T2 identical to the system type of the offshore complex system 2-B. Other complex systems of different types can be connected via further communication links to further input data interfaces of the remote monitoring apparatus 1 as also illustrated in FIG. 10. The different complex system 2-i can be of different system types T, for instance system type T1, system type T2 and system type T3. These different system types T can use different sensor tag names and/or event names. The different complex systems can be even manufactured by different manufacturers using different name conventions for sensor tags ST and/or event names EN. The sensor tags ST of the sensors deployed in the different investigated complex systems 2-i and/or the event names EN of detected events received from the investigated complex systems are mapped by the server 5 of the remote monitoring apparatus 1 automatically to the parameters of the abstract components of the provided base virtual object oriented data model loaded from the data base 4 of the remote monitoring apparatus 1 to generate a dedicated data model for the respective system type T of the investigated complex system 2. If, for instance, the investigated complex system is the first offshore complex system 2-A, the server 5 generates a dedicated data model for the first system type (system type T1). In contrast, if the investigated complex system is the second offshore system 2-B, the server 5 generates automatically a dedicated model for the second system type (system type T2). On the basis of the generated dedicated data model, the server 5 performs then a failure mode and/or a root-cause analysis of the respective investigated complex system 2. Accordingly, the present embodiments of the invention provides a model-driven technical solution for a failure mode and/or a root-cause analysis for complex systems such as gas and/or steam turbines. In case of a failure event, the time required for identifying and locating the component responsible for the failure is significantly reduced. Further, generic failure modes can be formulated for the whole turbine fleet comprising a plurality of different turbine systems using different sensor tags ST, component names and/or attributes. With the method according to embodiments of the present invention, monitoring, maintenance and repair of complex systems 2 is facilitated and made more transparent to a monitoring engineer of a remote monitoring and/or maintenance provider. Further, the method allows to increase the operation time of complex systems 2 and to reduce the down or shutdown time of the monitored complex systems 2. Consequently, the performance of the monitored complex system 2 is increased significantly. In a possible embodiment, the type of the investigated complex system 2 such as a turbine system 5 is automatically detected by the server of the remote monitoring apparatus 1 and a matching virtual object oriented data model is loaded from the data base 4 of the remote monitoring apparatus 1. For instance, if the server 5 detects that the investigated complex system is a turbine system, it does load the corresponding virtual object oriented data model of a turbine system such as illustrated in FIG. 5 from its data base 4. The loaded virtual object oriented data model is then used for mapping the sensor tags ST of sensors deployed in the turbine system and/or event names received from the investigated physical turbine system to the parameters of the abstract components of the provided base virtual object oriented data model of a turbine system as shown in FIG. 5.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for analyzing an investigated complex system of a specific system type, said investigated complex system comprising a plurality of system components, the method comprising the steps of:
   (a) providing a base virtual object oriented data model comprising abstract components corresponding to system components of the investigated complex system, wherein each abstract component of the base virtual object oriented data model comprises parameters and attributes of the respective system component of the investigated complex system;
   (b) mapping sensor tags of sensors deployed in the investigated complex system and/or event names of events received from the investigated complex system to the parameters of the abstract components of the provided base virtual object oriented data model to generate a dedicated data model for the specific system type of the investigated complex system; and
   (c) performing a failure mode and/or a root-cause analysis of the investigated complex system on the basis of the dedicated data model generated for the specific system type of the investigated complex system.

2. The method according to claim 1, wherein the base virtual object oriented data model is a tree structured hierarchical object oriented data model comprising the abstract components corresponding to the system components of the investigated complex system and being connected to each other via triple relations.

3. The method according to claim 1, wherein the base virtual object oriented data model is loaded from a data base of a remote monitoring service provider providing a remote monitoring service to monitor an operation of a number of complex systems of the same or different specific system types operated by clients of the remote monitoring service provider.

4. The method according to claim 3, wherein the attributes of the abstract components of the base virtual object oriented data model are set by means of a user interface of a remote server of said remote monitoring service provider and/or set automatically to default values preconfigured for the specific system type of the investigated complex system and stored in a data base of said remote monitoring service provider.

5. The method according to claim 3, wherein the investigated complex systems monitored by the remote monitoring service provider are distributed complex systems located in different client sites of clients of the remote monitoring service provider.

6. The method according to claim 3, wherein control signals and/or warning signals for the investigated complex system are generated automatically by a remote server of the remote monitoring service provider depending on the results of the failure mode and/or root-cause analysis performed by the remote server on the basis of the dedicated data model generated by the remote server for the specific system type of the investigated complex system.

7. The method according to claim 6, wherein the control signals generated by the remote server for the investigated complex system are applied to hardware and/or software system components of the investigated complex system to provide a remote repair service and/or remote maintenance service by said remote monitoring service provider to clients operating the investigated complex system.

8. The method according to claim 3, wherein the generation of the dedicated data model for a specific system type of a complex system by a remote server of the remote monitoring service provider is triggered by an event received by the remote server from the complex system and performed on the fly during operation of the complex system or is performed when the complex system is installed at a client site of a client of the remote monitoring service provider operating the complex system.

9. The method according to claim 1, wherein the sensor tags of sensors deployed in an investigated complex system and/or the event names of events are supplied by a data collector of the investigated complex system via a communication network to a remote server of a remote monitoring service provider.

10. The method according to claim 9, wherein the remote server of the remote monitoring service provider performs automatically the mapping of received sensor tags and/or received event names to the parameters of the abstract components of the base virtual object oriented data model loaded from the data base of said remote monitoring service provider to generate the dedicated data model for the system type of the investigated complex system.

11. The method according to claim 1, wherein the attributes of the abstract components of the provided base virtual object oriented data model comprise thresholds values.

12. The method according to claim 1, wherein the investigated complex system comprises a gas turbine system or a steam turbine system having a plurality of turbine system components.

13. A complex system comprising a plurality of hardware and/or software system components, said complex system being adapted to supply sensor tags of sensors deployed in the complex system and/or event names of events detected in said complex system via an interface to a monitoring apparatus performing the method according to claim 1.

14. A monitoring apparatus adapted to analyze an investigated complex system comprising a plurality of system components, said monitoring apparatus comprising:
 (a) a data base which stores a base virtual object oriented data model comprising abstract components corresponding to system components of the investigated complex system, wherein each abstract component of the base virtual object oriented data model comprises parameters and attributes of the respective system component of the investigated complex system;
 (b) a processing unit adapted to map sensor tags of sensors deployed in the investigated complex system and/or event names of events received from the investigated complex system to parameters of the abstract components of the base virtual object oriented data model and adapted to set the attributes of the abstract components of the base virtual object oriented data model to generate a dedicated data model for a specific system type of the investigated complex system; and
 (c) an analyzing unit adapted to perform a failure mode and/or root-cause analysis of the investigated complex system on the basis of the dedicated data model generated by said processing unit for the specific system type of the investigated complex system.

15. The monitoring apparatus according to claim 14, wherein the monitoring apparatus is a remote monitoring apparatus of a remote monitoring service provider connected via at least one communication network to a number of complex systems, wherein said remote monitoring apparatus comprises a remote server comprising said processing unit and said analyzing unit and being adapted to load the virtual object oriented data model from a data base of said remote monitoring apparatus.

* * * * *